US011345470B2

(12) United States Patent
Shafir (10) Patent No.: US 11,345,470 B2
(45) Date of Patent: May 31, 2022

(54) VERTICAL TAKEOFF AND LANDING LIGHT AIRCRAFT

(71) Applicant: Yehuda Shafir, Yavne (IL)

(72) Inventor: Yehuda Shafir, Yavne (IL)

(73) Assignee: Yehuda Shafir, Yavne (IL)

( * ) Notice: Subject to any disclaimer, the term of this patent is extended or adjusted under 35 U.S.C. 154(b) by 0 days.

(21) Appl. No.: 16/491,168

(22) PCT Filed: Mar. 7, 2018

(86) PCT No.: PCT/IL2018/050259
§ 371 (c)(1),
(2) Date: Sep. 5, 2019

(87) PCT Pub. No.: WO2018/163171
PCT Pub. Date: Sep. 13, 2018

(65) Prior Publication Data
US 2020/0031464 A1  Jan. 30, 2020

Related U.S. Application Data

(60) Provisional application No. 62/469,164, filed on Mar. 9, 2017.

(51) Int. Cl.
*B64C 29/00* (2006.01)
*B64C 25/32* (2006.01)

(52) U.S. Cl.
CPC .......... *B64C 29/0033* (2013.01); *B64C 25/32* (2013.01)

(58) Field of Classification Search
CPC ..... B64C 29/0033; B64C 25/32; B64C 27/12; B64C 2201/108; B64C 2201/128;
(Continued)

(56) References Cited

U.S. PATENT DOCUMENTS 2,937,823 A * 5/1960 Fletcher .............. B64C 29/0033
244/12.6
3,089,666 A * 5/1963 Quenzler ............ B64C 29/0033
244/7 R
(Continued)

FOREIGN PATENT DOCUMENTS

CN   203601574   5/2014
CN   205615726   10/2016
(Continued)

OTHER PUBLICATIONS

International Search Report and Written Opinion dated Jul. 4, 2018 for International Application No. PCT/L2018/050259 filed Mar. 7, 2018.
(Continued)

*Primary Examiner* — Medhat Badawi
(74) *Attorney, Agent, or Firm* — A.C. Entis-IP Ltd.; Allan C. Entis (57) ABSTRACT

A vertical takeoff and landing (VTOL) light aircraft comprising: a tilt-wing comprising port and starboard wings; a power train having: an electric motor coupled to a rotor for providing the aircraft with thrust for flight mounted to each of the port and starboard wings; a battery configured to store electric energy to power the electric motors; an electric generator; and a combustion engine configured to drive the generator to produce electric energy for storage in the battery; and a controller configured to autonomously control the tilt-wing and power train to provide VTOL takeoffs and landing having relatively short hover periods.

18 Claims, 7 Drawing Sheets

(58) Field of Classification Search
CPC ........ B64C 2201/024; B64C 2201/042; B64C 2201/066; B64C 37/02
See application file for complete search history.

(56) References Cited

U.S. PATENT DOCUMENTS

| | | | | |
|---|---|---|---|---|
| 3,159,361 | A * | 12/1964 | Weiland | B60V 1/14 244/12.1 |
| 3,179,354 | A * | 4/1965 | Alvarez-Calderon | B64C 23/00 244/12.4 |
| 3,404,852 | A * | 10/1968 | Sambell | B64C 29/0033 244/7 A |
| 3,592,412 | A * | 7/1971 | Glatfelter | B64C 29/0033 244/7 A |
| 4,979,698 | A * | 12/1990 | Lederman | B64C 29/0033 244/17.13 |
| 5,085,315 | A * | 2/1992 | Sambell | B64C 27/30 244/17.25 |
| 5,868,351 | A * | 2/1999 | Stamps | B64C 27/50 244/12.4 |
| 7,147,182 | B1 * | 12/2006 | Flanigan | B64C 29/0033 244/6 |
| 8,602,347 | B2 * | 12/2013 | Isaac | B64C 29/0033 244/23 B |
| 8,800,912 | B2 * | 8/2014 | Oliver | B64C 29/0033 244/12.4 |
| 8,998,125 | B2 * | 4/2015 | Hollimon | B64C 27/28 244/6 |
| 9,896,200 | B2 * | 2/2018 | Fredericks | B64C 11/28 |
| 9,957,042 | B1 * | 5/2018 | Vander Lind | B64C 29/0033 |
| 9,975,631 | B1 * | 5/2018 | McLaren | B64C 29/0033 |
| 10,144,503 | B1 * | 12/2018 | Vander Lind | B64C 29/0033 |
| 10,322,799 | B2 * | 6/2019 | McCullough | B64C 29/02 |
| 10,343,773 | B1 * | 7/2019 | McCullough | B64C 39/024 |
| 10,343,774 | B2 * | 7/2019 | Duque | B64C 39/024 |
| 2005/0133662 | A1 * | 6/2005 | Magre | B64C 29/0033 244/7 R |
| 2005/0230519 | A1 * | 10/2005 | Hurley | B64C 39/08 244/7 C |
| 2006/0113425 | A1 | 6/2006 | Rader | |
| 2009/0014599 | A1 * | 1/2009 | Cylinder | B64C 27/24 244/7 R |
| 2009/0224098 | A1 * | 9/2009 | Karem | B64C 29/0033 244/87 |
| 2011/0155859 | A1 * | 6/2011 | Vetters | B64C 29/0025 244/23 A |
| 2011/0168835 | A1 * | 7/2011 | Oliver | B64D 27/12 244/12.4 |
| 2012/0211608 | A1 * | 8/2012 | Pancotti | B64C 29/0033 244/7 C |
| 2012/0248259 | A1 * | 10/2012 | Page | B64C 29/02 244/7 A |
| 2015/0266571 | A1 * | 9/2015 | Bevirt | B64C 11/28 244/7 C |
| 2015/0274289 | A1 * | 10/2015 | Newman | B64C 29/0025 244/12.4 |
| 2016/0101853 | A1 * | 4/2016 | Toppenberg | B64C 29/0033 244/7 A |
| 2016/0114887 | A1 * | 4/2016 | Zhou | G08G 5/045 348/148 |
| 2016/0200436 | A1 * | 7/2016 | North | B64C 39/024 244/7 R |
| 2016/0229531 | A1 * | 8/2016 | Robertson | B64C 39/04 |
| 2016/0244158 | A1 * | 8/2016 | Fredericks | B64C 3/40 |
| 2016/0304194 | A1 * | 10/2016 | Bevirt | B64C 27/30 |
| 2016/0325629 | A1 * | 11/2016 | Siegel | B60L 11/12 |
| 2017/0066531 | A1 * | 3/2017 | McAdoo | B64C 27/26 |
| 2017/0101176 | A1 * | 4/2017 | Alber | B64C 29/0033 |
| 2017/0129617 | A1 * | 5/2017 | Shah | B64D 27/24 |
| 2017/0174342 | A1 * | 6/2017 | Huang | B64C 29/0033 |
| 2017/0203839 | A1 * | 7/2017 | Giannini | B64C 3/385 |
| 2017/0210469 | A1 * | 7/2017 | Piasecki | B64C 29/00 |
| 2017/0297698 | A1 * | 10/2017 | Alber | B64C 1/063 |
| 2017/0369162 | A1 * | 12/2017 | Alzahrani | B64C 39/024 |
| 2018/0002012 | A1 * | 1/2018 | McCullough | B64D 25/12 |
| 2018/0002014 | A1 * | 1/2018 | McCullough | B64C 39/06 |
| 2018/0002026 | A1 * | 1/2018 | Oldroyd | B64C 29/02 |
| 2018/0044012 | A1 * | 2/2018 | Groninga | B64D 35/04 |
| 2018/0044013 | A1 * | 2/2018 | Groninga | B64C 29/0033 |
| 2018/0057157 | A1 * | 3/2018 | Groninga | B64C 27/28 |
| 2018/0065739 | A1 * | 3/2018 | Vondrell | B64D 27/24 |
| 2018/0065742 | A1 * | 3/2018 | Vondrell | H02K 7/1823 |
| 2018/0086447 | A1 * | 3/2018 | Winston | B64D 27/24 |
| 2018/0086448 | A1 * | 3/2018 | Kroo | B64C 29/0033 |
| 2019/0291863 | A1 * | 9/2019 | Lyasoff | B64C 29/0033 |

FOREIGN PATENT DOCUMENTS

| | | |
|---|---|---|
| DE | 102010021022 | 11/2011 |
| EP | 3000722 | 3/2016 |
| WO | 2012141736 | 10/2012 |
| WO | 2015143093 | 9/2015 |

OTHER PUBLICATIONS

International Preliminary Report on Patentability dated Jun. 24, 2019 for International Application No. PCT/IL2018/050259 filed Mar. 7, 2018.

European Search Reported dated Feb. 3, 2020 for Application No. 18763577.6 filed Sep. 16, 2019.

European Office Action dated Mar. 2, 2020 for Application No. 18763577.6 filed Sep. 16, 2019.

* cited by examiner

VERTICAL TAKEOFF AND LANDING LIGHT AIRCRAFT

RELATED APPLICATIONS

The present application is a U.S. National Phase of PCT Application No. PCT/IL2018/050259 filed on Mar. 7, 2018, which claims the benefit under 35 U.S.C. 119(e) of U.S. Provisional Application 62/469,164 filed Mar. 9, 2017, the disclosures of which are incorporated herein by reference.

FIELD

Embodiments of the invention relate to providing a vertical takeoff and landing (VTOL) light aircraft.

BACKGROUND

A vertical takeoff and landing (VTOL) aircraft is an aircraft capable of taking off and landing vertically, and whereas helicopters are VTOL aircraft, the class of aircraft considered VTOL aircraft also includes aircraft that can takeoff vertically, transition to conventional fixed wing flight, and for landing transition back to vertical flight. VTOLs capable of "conventional" flight reconfigure their power trains between configurations that provide thrust for vertical flight and configurations that provide thrust for conventional fixed wing flight. Reconfiguring may comprise rotating engines that provide thrust for powered flight through about 900 or more between substantially vertical and substantially horizontal directions relative to the VTOL aircraft in which they are mounted. Reconfiguring may comprise redirecting thrust from engines that are stationary relative to the VTOL aircraft for which they provide thrust. The Bell Boeing V-22 Osprey is a tilt rotor aircraft that is an example of a VTOL that rotates its engines to transition between vertical and conventional, fixed wing flight. The Harrier aircraft and F-35B Lightning II Joint strike Fighter (JSF) are examples of VTOL aircraft that use directed thrust to convert between vertical and convention fixed wing flight.

VTOL aircraft that may also be controlled to fly as fixed wing aircraft are typically mechanically complex and relatively difficult to control to provide safe flight. In particular transition between conventional flight and vertical flight for takeoff and landing presents complex engineering and control challenges to assure convenient and safe flight. Hereinafter, for convenience of presentation reference to a VTOL aircraft is considered to be reference to a VTOL capable of transition to conventional fixed wing flight.

SUMMARY

An aspect of an embodiment of the disclosure relates to providing a vertical takeoff and landing (VTOL), tiltrotor, light aircraft comprising a controller configured to control the aircraft power train, wing, flight control surfaces, and/or rotor or propeller tilt to provide the aircraft with takeoff and landing flight paths characterized by relatively short hover periods. In an embodiment, the aircraft is powered by a hybrid electric/combustion powertrain. The hybrid powertrain comprises electric motors that drive the aircraft rotors and a combustion engine coupled to a generator selectively switchable to provide electrical power directly to the electric motors or to charge a battery that provides electrical power to the electric motors. In an embodiment, a component of the power train, optionally the battery, is moveable along a longitudinal axis of the aircraft to adjust a location of the center of gravity (CG) of the aircraft to compensate for changes in CG location caused by aircraft payload. Hereinafter a VTOL tiltrotor aircraft in accordance with an embodiment of the disclosure may be referred to as a "SafeTilt" aircraft or simply "SafeTilt".

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the following detailed description, components of a SafeTilt aircraft in accordance with an embodiment are discussed with reference to a perspective view of the aircraft shown in FIG. 1. Angles defining orientation of a SafeTilt aircraft, and its flight surfaces and rotor tilt are shown in, and discussed with reference to, side views of SafeTilt shown in FIGS. 2A and 2B. Changes in the angles defined and shown in FIGS. 2A and 2B, during a VTOL takeoff of SafeTilt and output power of SafeTilt's powertrain, as a function of time during the takeoff are graphed in FIG. 3A. Changes in the angles defined and shown in FIGS. 2A and 2B during a VTOL landing of SafeTilt and output power of SafeTilt's power train, as a function of time during the landing are graphed in FIG. 3B.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of items it conjoins.

Figure 1:
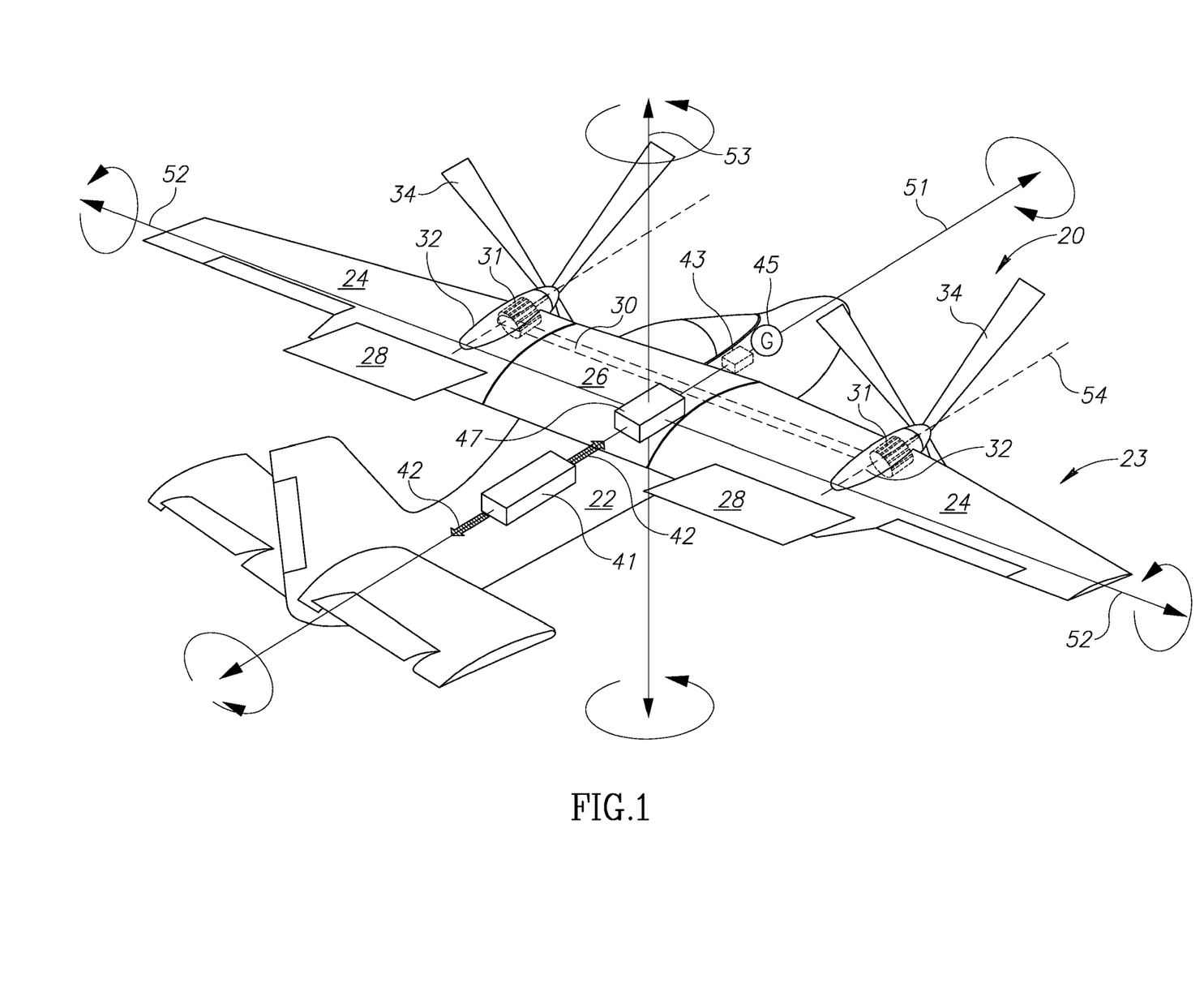
FIG. 1 schematically shows a VTOL SafeTilt aircraft in accordance with an embodiment of the disclosure.

FIG. 1 schematically shows a SafeTilt VTOL light aircraft 20, also referred to as "SafeTilt aircraft" or simply "SafeTilt", comprising a fuselage 22 and an overhead tilt-wing 23 comprising port and starboard wings 24 coupled by a wing pivot 30, shown in dashed lines, mounted in a wing root 26. Electric motors 31 housed in wing nacelles 32 are fixed to ends of wing pivot 30 and drive rotors 34 to provide thrust for powering flight. A wake flap 28 is mounted to each port and starboard wing 24 so that it is positioned in a wake generated by rotation of the wing's rotor 34 and may be used to deflect the wake to control direction of thrust provided by the rotor. Power to drive electric motors 31 is provided by a battery 41 and a combustion engine 43 configured to drive an electric generator 45, which is selectively switchable between providing power directly to electric motors 31 or to charge battery 41. Electric motors, battery 41, combustion engine 43, and electric generator are collectively referred to as a powertrain of SafeTilt aircraft 20.

A controller 47 controls the powertrain and a pivot drive (not shown) coupled to wing pivot 30 to control rotation of the wing pivot about a lateral, pitch axis 52 of SafeTilt aircraft 20 and thereby a tilt angle, "ω", of tilt-wing 23 and rotors 34 relative to a longitudinal, roll axis 51, of the aircraft. Tilt angle ω and other angles relevant to operation of SafeTilt 20 are schematically shown in, and discussed below with reference to FIGS. 2A and 2B.

In an embodiment, at least one component of SafeTilt's powertrain is translatable along longitudinal axis 51, and controller 47 may control location of the at least one component along the axis to maintain location of the CG of SafeTilt 20 within a safe CG range under different conditions of the aircraft payload. By way of example, SafeTilt 20 may have force sensors (not shown) mounted in the landing gear of the aircraft, and before takeoff controller 47 may adjust the at least one component responsive to force readings provided by the sensors so that the CG of SafeTilt is located substantially at the pivot point of overhead tilt-wing 23. Setting the CG substantially at the pivot point may be advantageous for takeoff and landing because it may reduce magnitude of moments generated by control of wake flaps 28 that may be required from the wake-flaps to control aircraft pitch. Advantageously the pivot point and CG should be forward of the aerodynamic center of tilt-wing 23 to provide the aircraft with static stability. Optionally, the at least one component of SafeTilt's powertrain comprises battery 41 and in FIG. 1 block arrows 42 indicate that battery 41 is moveable along longitudinal axis 51 by controller 47 to control location of the CG of SafeTilt aircraft 20. In an embodiment, battery 41 may be mounted to a support carriage coupled to a worm drive, rack and pinion, or scotch yoke transmission (not shown) controllable by controller to move the carriage and thereby the battery back and forth along longitudinal axis 51.

Figure 2A:
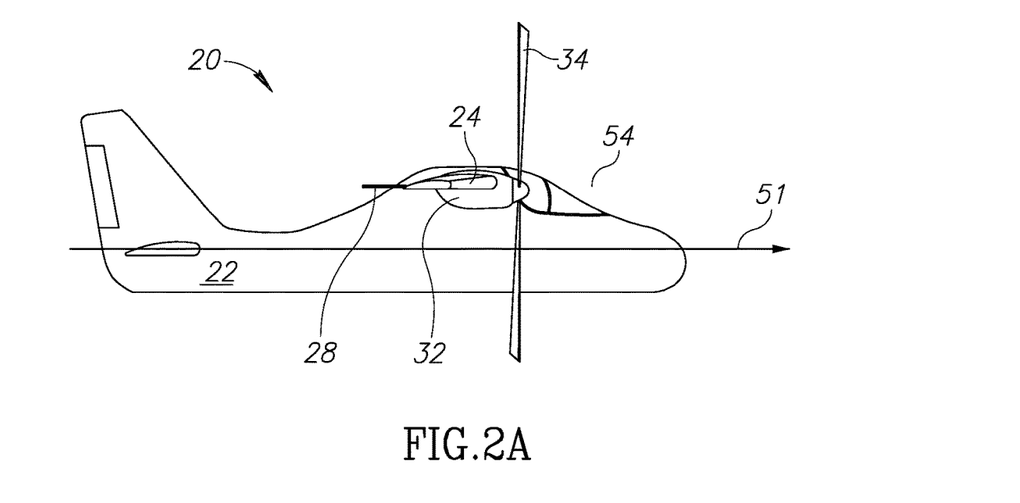
FIGS. 2A-2B show partial cutaway views of SafeTilt for different tilt angles of the wing and pitch angles of the aircraft in accordance with an embodiment of the disclosure.
Figure 2B:
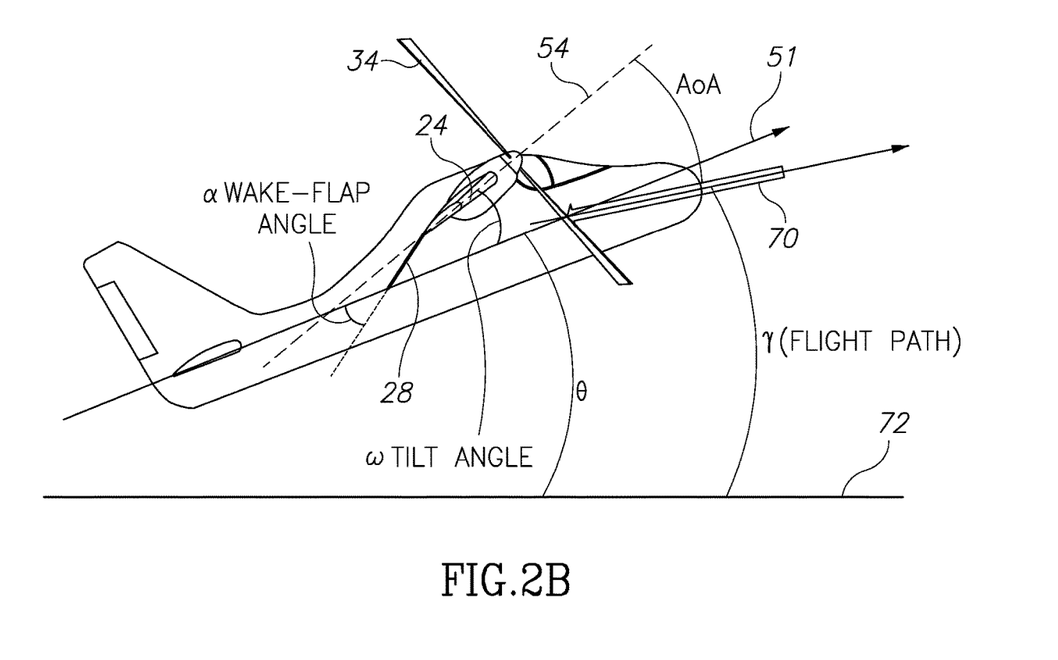

FIGS. 2A and 2B schematically show the tilt angle of tilt-wing 23, and angles that define orientation of SafeTilt relative to the ground, which is represented by a line 72 in the figures. An angle θ that longitudinal axis 51 makes with the ground is referred to as pitch, θ, of the SafeTilt aircraft. In FIG. 2A the pitch angle θ is zero and not explicitly shown, and in FIG. 2B the aircraft is angled nose up and the pitch angle θ is positive. A block arrow 70 in FIG. 2B schematically represents airflow relative to a flightpath of SafeTilt 20. An angle referred to as an angle of attack AoA, shown in FIG. 2B is an angle between a direction of airflow, 70, and a direction of a chord line, represented by a dashed line 54 of tilt-wing 23. Chord line 54 of the tilt-wing also represents a direction along which rotors 34 provide thrust. Assuming there is no wind, relative airflow is due only to motion of the SafeTilt aircraft and a flight path of the aircraft, as schematically indicated by an arrow 71 in FIG. 2B, is directly opposite airflow 70. As a result, a flight path angle, conventionally designated as an angle "γ", relative to ground 72 is an angle between airflow 70 and ground 72. A wake flap angle, α, is an angle between tilt-wing chord line 54 and a plane of wake flap 28. Controller 47 may control wake flap angle α to adjust pitch θ of SafeTilt 20 and/or to direct thrust provided by rotors 34.

By way of a numerical example, a SafeTilt aircraft in accordance with an embodiment of the disclosure, such as shown in FIG. 1 may have a length of about 7.4 m (meters), a tilt-wing 23 having a wingspan of about 10.5 m and area, including wake flaps 28, of about 15 m$^2$, and a maximum takeoff mass "M" of about 620 kg (kilogram) and weight W=Mg where g is the acceleration of gravity. Combustion engine 43 may have an output power of about 100 Hp and each electric engine 31 an output power of about 120 Hp (horsepower).

Figure 3A:
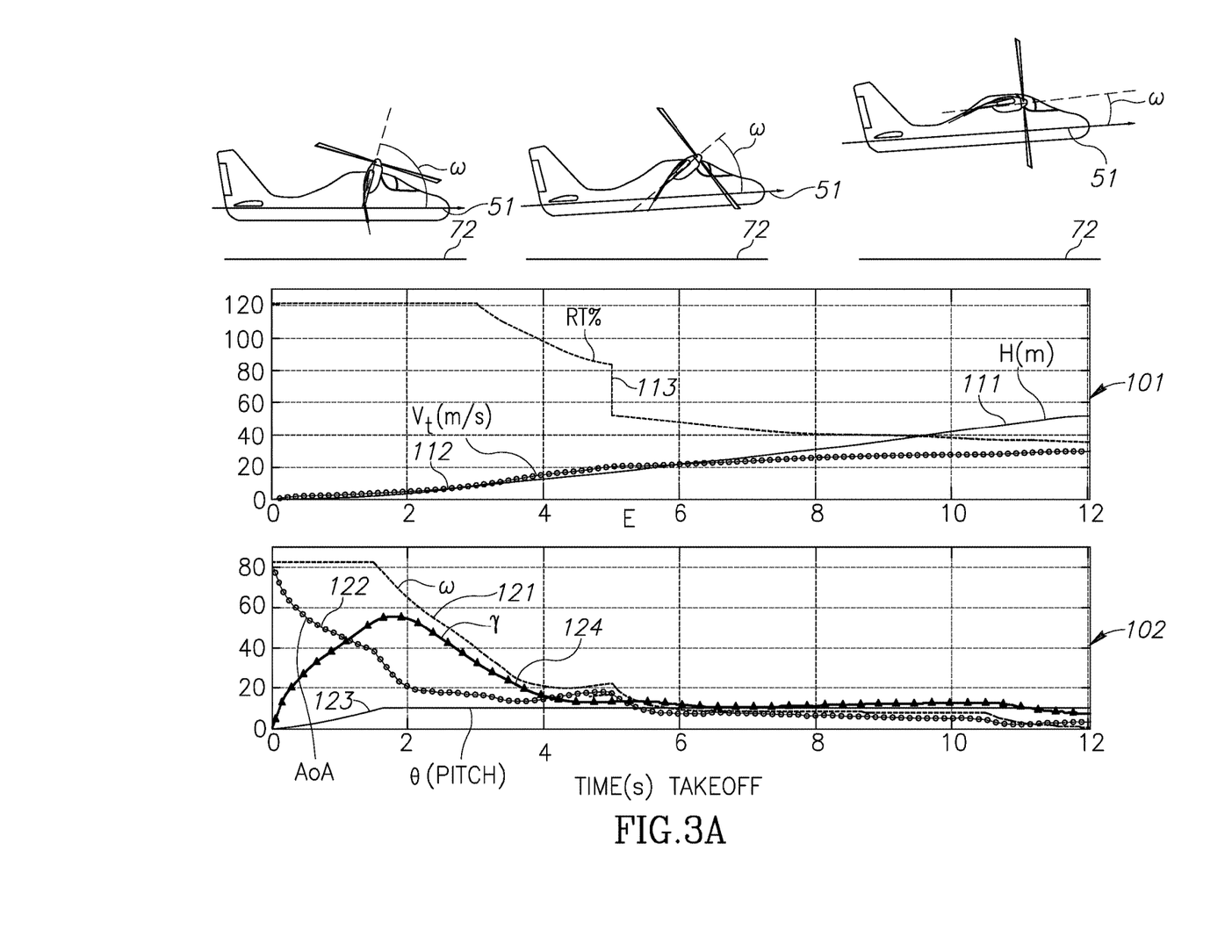
FIG. 3A shows graphs of parameters characterizing SafeTilt flight path, flight control surfaces, and powertrain output power during VTOL takeoff, in accordance with an embodiment of the disclosure

FIG. 3A shows two graphs 101 and 102 comprising graph lines that show flight parameters as a function of time during VTOL takeoff of SafeTilt under control of controller 47 in accordance with an embodiment of the disclosure. Graph 101 shows graph lines 111, 112, and 113 respectively of, height "H" in meters above ground, airspeed, "$V_t$", in meters per second (m/s), and rotor thrust, "RT", in percentage of SafeTilt weight W, as functions of time from initiation of takeoff. Graph 102 shows graph lines 121, 122, 123, 124, and 125 respectively of tilt angle ω, angle of attack AoA, pitch angle θ, and flight path angle γ, and rotor thrust RT as functions of time from initiation of takeoff. Vertical lines that intersect graph lines in both graphs 101 and 102 indicate, and are labeled by times of interest during takeoff.

The graph lines show that for a takeoff that conforms to time dependence of parameters graphed in graph lines 111-113, 121-124 SafeTilt 20 exhibits a relatively short hover period of about 5 s during which thrust provided by rotation of rotors 34 comprised in the powertrain of SafeTilt is relatively high. As a result of the short takeoff hover period a SafeTilt aircraft in accordance with an embodiment of the disclosure controlled during takeoff by its controller, provides advantageous security for VTOL takeoff.

Figure 3B:
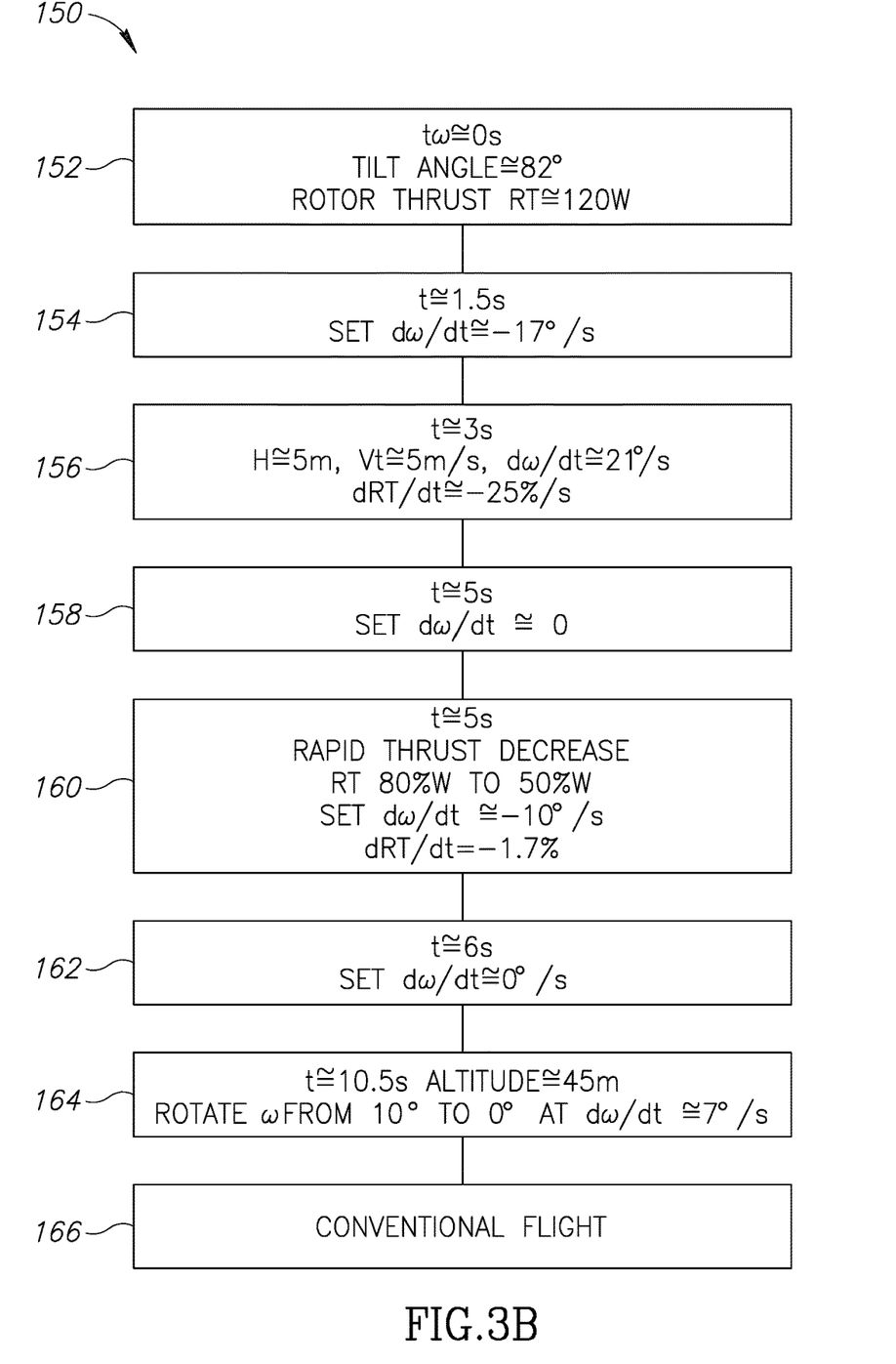
FIG. 3B shows a flow diagram of a procedure by which a controller of a SafeTilt aircraft controls VTOL takeoff, in accordance with an embodiment of the disclosure.

A flow diagram 150 shown in FIG. 3B illustrates a procedure by which controller 47 controls SafeTilt 20 to takeoff in a manner for which parameters shown in graphs 101 and 102 exhibit time dependence substantially as shown in the graphs. Times referred to in the flow diagram are marked and labeled by witness lines in FIG. 3A.

In a block 152 at a time t=0 controller 47 initiates takeoff by controlling the wing pivot drive to rotate wing pivot 30 and thereby overhead tilt-wing 23 and AoA to a tilt angle ω equal to about 82° controlling the SafeTilt aircraft power train to generate rotor thrust RT equal to about 120% W, in symbols RT≈120% W. Optionally, in a block 154 at about a time t=1.5 s controller 47 begins decreasing tilt angle ω at a rate, dω/dt, equal to about −17°/s. At 3 s from initiation of takeoff, as noted in a block 156, SafeTilt is at a height of about 5 m, has airspeed of about 5 m/s, and controller 47 is decreasing tilt angle ω at a rate dω/dt≈−21°/s and as a result of increase of aircraft airspeed thrust is decreasing from RT≈120% W at a rate dRT/dt≈−25% per second. At a time into takeoff of about 4 s, tilt angle ω is equal to about 20° and optionally in a block 158 controller 47 operates to maintain dω/dt≈0. At about 5 s, at a height equal to about 18 m, and airspeed equal to about 20 m/s, optionally in a block 160, controller 47 rapidly decreases thrust RT from about 80% W to about 50% W, restarts decreasing ω at dω/dt, ≈−10°/s and optionally continues to decrease RT at a moderate rate of dRT/dt≈−1.7%. At about 6 s into takeoff tilt angle ω has been reduced to about 100 and optionally in a block 162 controller 47 sets dω/dt, ≈0°/s. At about 10.5 s into takeoff SafeTilt is safely airborne at a height of about 45 m, airspeed $V_t$ about 30 m/s, pitch θ about 10°, and flight path γ at about 12°. Optionally in a block 164 controller 47 rotates tilt-wing from ω≈10° to about 0° at a rate dω/dt, ≈7°/s to transition SafeTilt to conventional fixed wing flight mode and in a block 166 assumes conventional fixed wing flight.

It is noted that duration of VTOL takeoff from liftoff to conventional fixed wing flight of a SafeTilt aircraft, such as SafeTilt 20, in accordance with an embodiment of the disclosure may be relatively short, and is characterized by a relatively short hover period during which the aircraft power train is required to provide enhanced thrust. For example, the VTOL takeoff characterized by parameters graphed in graphs 101 and 102, has a hover period of about 5 s, relatively rapid changes in thrust RT demand at the end of the hover period at 5 s, and a duration of about 12 s. The relatively rapid changes in thrust that may characterize the VTOL takeoff are advantageously facilitated by electric motors 31. Electric motors 31 are generally characterized by short response times in comparison to combustion engine 43, and are capable of rate and magnitude of change in power output that are relatively fast and large in comparison to that which may be provided by a combustion engine. The relatively short hover period of VTOL takeoff in accordance with an embodiment contributes to increased safety of the takeoff and reduced risk of disastrous accident due to single engine failure.

Figure 4A:
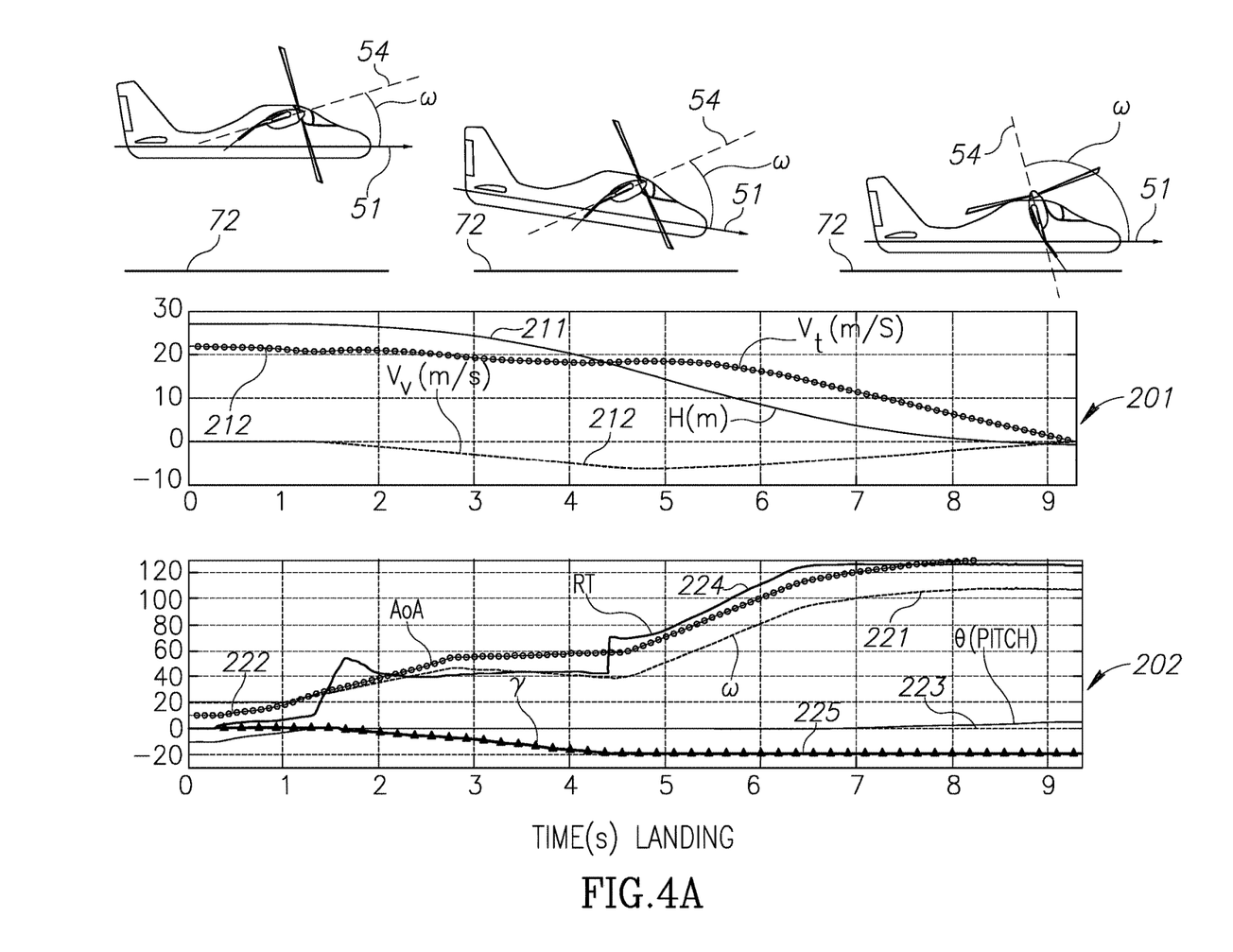
FIG. 4A shows graphs of parameters characterizing SafeTilt flight path, flight surfaces, and powertrain output power during VTOL landing, in accordance with an embodiment of the disclosure.

FIG. 4A shows two graphs 201 and 202 comprising graph lines that show flight parameters as a function of time during landing of SafeTilt 20 from a height of about 27 m, under control of controller 47 in accordance with an embodiment of the disclosure. Graph 201 shows graph lines 211, 212, and 213 respectively of, height, H, airspeed $V_t$ (m/s), and vertical velocity $V_v$ as functions of time from initiation of landing procedure. Graph 202 shows graph lines 221, 222, 223, 224, and 225 respectively of tilt angle ω, angle of attack AoA, pitch angle θ rotor thrust RT, and γ as functions of time from initiation of landing.

Figure 4B:
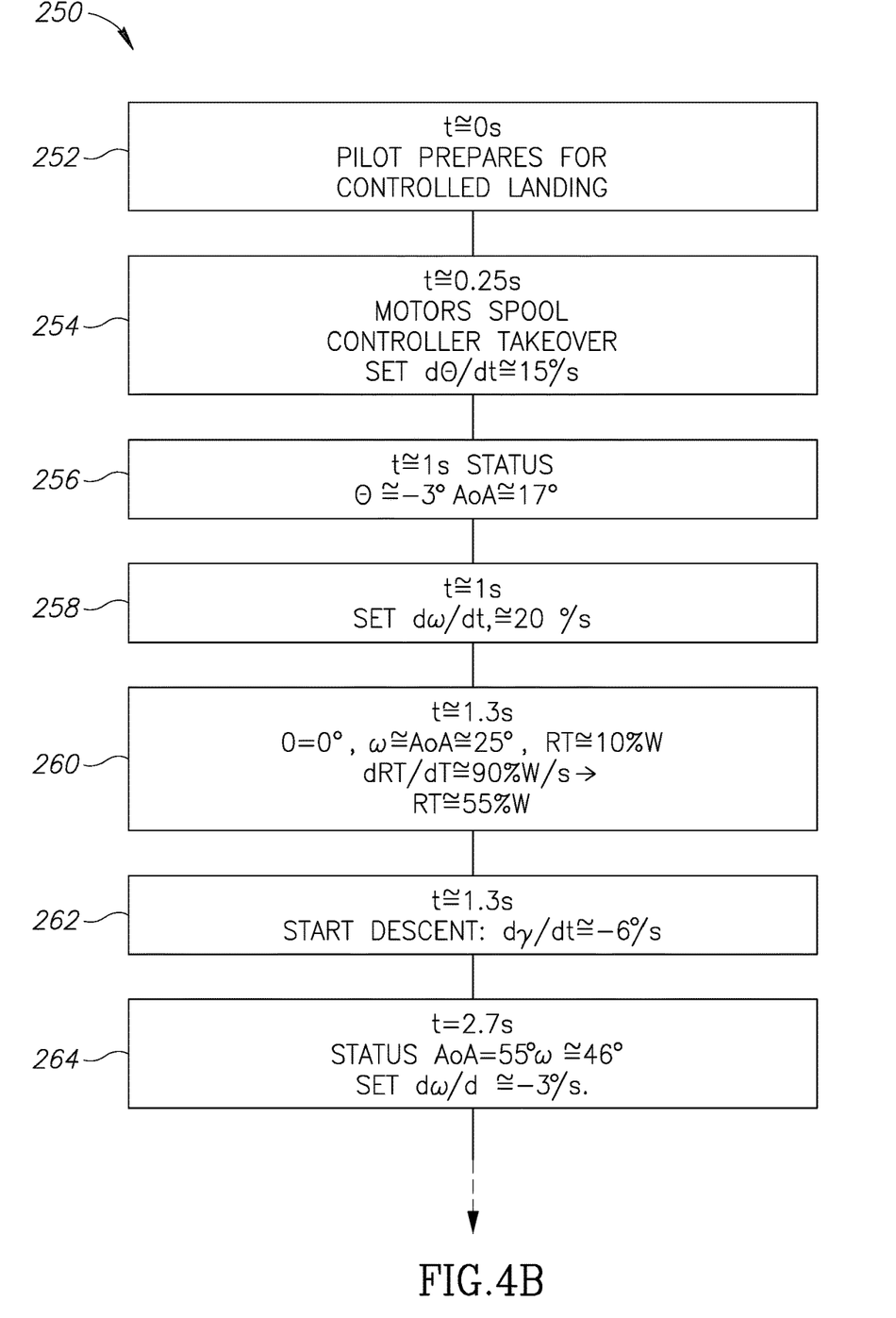
FIG. 4B-4C shows a flow diagram of a procedure by which a controller of a SafeTilt aircraft controls VTOL landing, in accordance with an embodiment of the disclosure.
Figure 4C:
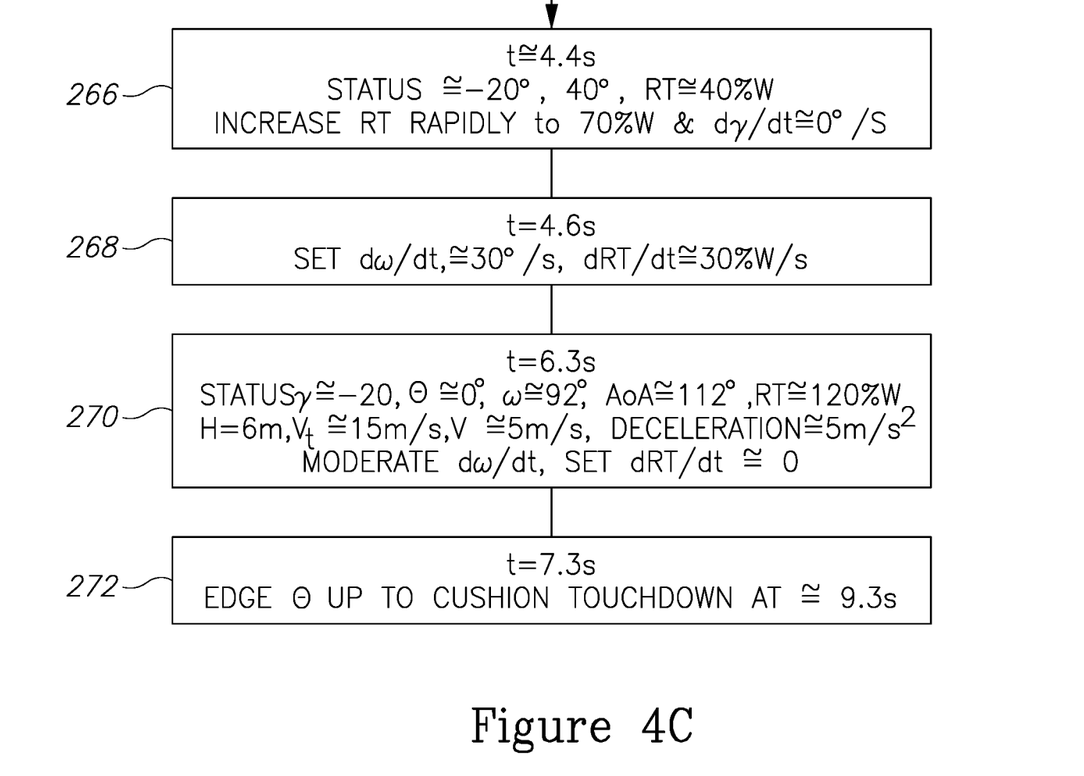

A flow diagram 250 shown in FIG. 4B-4C illustrates a procedure by which controller 47 controls SafeTilt 20 to land in manner for which parameters graphed in graphs 201 and 202 exhibit time dependence substantially as shown in the graphs. Times referred to in the flow diagram are times marked and labeled by witness lines in FIG. 4A.

In a block 252 at a time t=0 the pilot has controlled SafeTilt 20 to prepare for landing under control of controller 47, in accordance with an embodiment of the disclosure. SafeTilt is traveling at a height of 27 m at airspeed 22 m/s, and slowly decelerating with electric motors 31 set to 0 power, flight path γ≈0, pitch θ≈−10°, and ω≈20°, so that AoA is equal to about 10°. Shortly thereafter, optionally at a time t≈0.25 in a block 254, control of the SafeTilt aircraft for landing is transferred to controller 47, and the controller allows electric motors 31 to spool to offset loss of lift due to aircraft deceleration and controls aircraft pitch θ to increase at rate dθ/dt≈15°/s. In a block 256, at a time of about t=1 s θ has increased to about −3° and SafeTilt AoA has increased to about 17° as a result of the increase in θ, and optionally in a block 258 controller 47 controls tilt angle ω to increase at a constant rate dω/dt≈20°/s. At a time of about 1.3 s, as shown in a block 260, pitch θ has increased and been set to about 0°, tilt angle ω and AoA are equal to about 25°, and rotor thrust is RT≈10% W. At this time lift provided by tilt wing 23 has decreased substantially because of increase in ω which has increased the AoA beyond a stall AoA and as also shown in block 260 controller 47 rapidly increases rotor thrust RT at a rate of about 90% W/s to a thrust RT≈55% to compensate for loss of lift. The rapid increase in thrust RT at about time 1.3 s to compensate for loss of lift in accordance with an embodiment is facilitated by electric motors 31, which are controllable to provide the large increases in power advantageous at about time 1.3 s into the VTOL landing as shown in graph 202. In a block 262 controller 47 controls SafeTilt 20 to begin descent from the initial height of about 27 m and decreases flight path angle γ from about 0° at, optionally, a constant rate dγ/dt≈−6°/s.

At about a time 2.75 s into the landing procedure, AoA has increased to about 55° and ω has increased to about 46° as a result of the constant rate of increase in tilt angle ω set by controller 47 in block 258, and the controller, optionally in a block 264 controls ω to decrease at moderate rate dω/dt to about −3.0°/s. From about time t=2.75 s controller controls tilt angle ω to control deceleration of SafeTilt 20 during landing and maintain deceleration to less than 5 m/s and ω to less than about 110°.

At about a time t≈4.4 s, shown in a block 266, flightpath angle γ has decreased to about −20° as a result of the constant rate of decrease in γ set by controller 47 in block 262, and ω has decreased to about 40°. Controller 47 increases RT rapidly from about 40% W to about 70% W to reduce rate of decrease of γ to about 0°/s and stabilize flight path descent angle at −20°. Shortly thereafter, optionally in a block 268, controller 47 increases tilt angle ω and rotor thrust RT at constant rates of increase of respectively dω/dt≈30°/s and dRT/dt≈30% W/s until about a time 6.3 s shown in a block 270. At time 6.3 s flightpath angle γ≈−20, pitch θ≈0°, and ω≈92°, AoA≈112°, and RT≈120% W. Height H above ground at time 6.3 is equal to about 6 m, airspeed $V_t$ is equal to about 15 m/s, speed of descent $V_v$ is equal to about 5 m/s, and deceleration has reached about 5 m/s². In block 270 controller 47 moderates rate of increase dω/dt to maintain deceleration of airspeed below 5 m/s² and reduces rate dRT/dt of increase in RT to substantially 0°. At about a time 7.3 s, shown in a block 272 SafeTilt 20 descends through 4 m above ground and controller 47 increases pitch angle θ slightly to cushion touchdown at about time 9.3 s.

As in the case of a VTOL takeoff, transition from conventional fixed wing flight to VTOL touchdown of a SafeTilt aircraft, such as SafeTilt 20, in accordance with an embodiment of the disclosure may be relatively short, and is characterized by a relatively short hover period and relatively rapid changes in power output of the aircraft power train. For example, the VTOL landing procedure characterized by parameters graphed in graphs 201 and 202, has duration of about 10 s, as noted above has rapid changes in power train output power at about 1.3 and 4.4 seconds into the landing procedure, and a relatively short hover period during which engine failure may be disastrous of about 5 s.

In an embodiment during the landing flight to a landing spot, if SafeTilt 20 is blown off course, for example by a crosswind, rather than controlling SafeTilt 20 to navigate back to the original track to the landing spot, controller 47 may be configured to recalculate and follow a new landing track to the landing spot. Recalculating the track towards the landing spot in accordance with an embodiment reduces the magnitude of the crosswind component that might affect the landing flightpath.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A vertical takeoff and landing (VTOL) light aircraft comprising:
   a tilt-wing comprising port and starboard wings rotatable to a tilt-angle $\omega$;
   a power train having:
   an electric motor coupled to a rotor for providing the aircraft with rotor thrust (RT) for flight mounted to each of the port and starboard wings;
   a battery configured to store electric energy to power the electric motors;
   an electric generator; and
   a combustion engine selectively switchable to drive the generator to produce electric energy for storage in the battery or to provide electrical power directly to the electric motor; and
   a controller configured to autonomously control the tilt-wing and power train to provide a VTOL takeoff having a short takeoff hover period of a duration less than or equal to about 7 seconds, by controlling the tilt-wing to reduce $\omega$ from about 82° to about 20° and reduce the RT from about 120% of a loaded weight of the aircraft to about 50% of the loaded weight of the aircraft during the VTOL takeoff hover period duration.

2. The VTOL light aircraft according to claim 1 wherein the VTOL takeoff hover period has a duration less than or equal to about 5 seconds.

3. The VTOL light aircraft according to claim 1 wherein the controller is configured to autonomously control the tilt-wing, and power train to provide a VTOL landing having a relatively short landing hover period.

4. The VTOL light aircraft according to claim 3 wherein the controller is configured to provide the VTOL landing hover period with a duration less than or equal to about 7 seconds by controlling the tilt-wing and power train to increase $\omega$ from about 20° to about 110° and RT from about 10% of the loaded weight of the aircraft to about 125% of the loaded weight during the VTOL landing hover period duration.

5. The VTOL light aircraft according to claim 4 wherein the VTOL landing hover period has a duration less than or equal to about 5 seconds.

6. The VTOL light aircraft according to claim 1 wherein at least one component of the power train is moveable along a longitudinal roll axis of the aircraft.

7. The VTOL light aircraft according to claim 6 wherein the controller is configured to control location of the at least one component along the longitudinal axis to control a location of the center of gravity (CG) of the aircraft.

8. The VTOL light aircraft according to claim 7 wherein the aircraft comprises landing gear and force sensors coupled to the landing gear configured to provide force signals responsive to weight of the aircraft supported by the landing gear when the aircraft is on the ground, and the controller is configured to control location of the at least one component responsive to the force signals.

9. The VTOL light aircraft according to claim 8 wherein the at least one moveable component comprises the battery.

10. The VTOL light aircraft according to claim 1 wherein a maximum takeoff mass of the aircraft is less than 1000 kg.

11. The VTOL light aircraft according to claim 10 wherein the maximum takeoff mass is equal to about 620 kg.

12. The VTOL light aircraft according to claim 11 wherein the aircraft has a length equal to about 7.4 m.

13. The VTOL light aircraft according to claim 10 wherein the aircraft has a wingspan equal to about 10.5 m.

14. The VTOL light aircraft according to claim 13 wherein the aircraft has a wing area equal to about 15 m$^2$.

15. The VTOL light aircraft according to claim 14 wherein the powertrain is controllable to provide thrust that is equal to or greater than about 120% of the maximum takeoff weight.

16. A vertical takeoff and landing (VTOL) light aircraft comprising:
   a tilt-wing comprising port and starboard wings rotatable to a tilt-angle $\omega$;
   a power train having:
   an electric motor coupled to a rotor for providing the aircraft with rotor thrust (RT) for flight mounted to each of the port and starboard wings;
   a battery configured to store electric energy to power the electric motors;
   an electric generator; and
   a combustion engine configured to drive the generator to produce electric energy for storage in the battery; and
   a controller configured to autonomously control the tilt-wing and power train to provide a VTOL takeoff having a relatively short takeoff hover period of a duration less than or equal to about 7 seconds.

17. The VTOL light aircraft according to claim 16 wherein the controller is configured to provide the VTOL takeoff hover period with the duration less than or equal to about 7 seconds by controlling the tilt-wing and power train to reduce $\omega$ from about 82° to about 20° and RT from about 120% of a loaded weight of the aircraft to about 50% of the loaded weight of the aircraft during the VTOL takeoff hover period duration.

18. The VTOL light aircraft according to claim 16 wherein the VTOL takeoff hover period has a duration less than or equal to about 5 seconds.

* * * * *